United States Patent
Veismann et al.

(10) Patent No.: US 8,899,153 B2
(45) Date of Patent: Dec. 2, 2014

(54) PRINTING MACHINE AND METHOD OF OPERATING THE MACHINE TO AVOID UNDESIRED VIBRATIONS

(75) Inventors: Hermann-Josef Veismann, Hoerstel (DE); Frank Westhof, Recke (DE); Uwe Hoewelmeyer, Ibbenbueren (DE)

(73) Assignee: Windmoeller & Hoelscher KG, Lengerich (DE)

( * ) Notice: Subject to any disclaimer, the term of this patent is extended or adjusted under 35 U.S.C. 154(b) by 973 days.

(21) Appl. No.: 12/452,863

(22) PCT Filed: Jul. 25, 2008

(86) PCT No.: PCT/EP2008/059799
§ 371 (c)(1),
(2), (4) Date: Jan. 26, 2010

(87) PCT Pub. No.: WO2009/013355
PCT Pub. Date: Jan. 29, 2009

(65) Prior Publication Data
US 2010/0126365 A1    May 27, 2010

(30) Foreign Application Priority Data

Jul. 26, 2007   (DE) .......................... 10 2007 035 476

(51) Int. Cl.
| | | |
|---|---|---|
| *B41F 33/08* | (2006.01) | |
| *B41F 33/16* | (2006.01) | |
| *B41F 13/004* | (2006.01) | |
| *B41F 13/08* | (2006.01) | |
| *B41F 33/00* | (2006.01) | |
| *F16F 15/03* | (2006.01) | |

(52) U.S. Cl.
CPC .......... *B41F 13/085* (2013.01); *B41F 13/0045* (2013.01); *B41F 33/0009* (2013.01); *B41F 33/08* (2013.01); *B41F 33/16* (2013.01); *F16F 15/03* (2013.01); *B41P 2213/42* (2013.01)
USPC .......................................... 101/484; 101/216

(58) Field of Classification Search
CPC .. B41F 13/004; B41F 13/0045; B41F 13/085; B41F 33/0009; B41F 33/08; B41F 33/16; F16F 15/02; F16F 15/03; B41P 2213/42
USPC .................................................. 101/484, 216
See application file for complete search history.

(56) References Cited

U.S. PATENT DOCUMENTS

| | | |
|---|---|---|
| 5,988,063 A | 11/1999 | Brandenburg et al. |
| 6,647,874 B1 | 11/2003 | Siegl et al. |

(Continued)

FOREIGN PATENT DOCUMENTS

| | | |
|---|---|---|
| DE | 197 40 153 A1 | 3/1999 |
| DE | 10 2004 062 112 A1 | 7/2006 |

(Continued)

*Primary Examiner* — Leslie J Evanisko
(74) *Attorney, Agent, or Firm* — Jacobson Holman Hershkovitz, PLLC.

(57) ABSTRACT

A method and an apparatus for operating a printing press determine the vibration behavior of at least one impression cylinder of the printing press, with the avoidance or suppression of undesirable vibrations such as resonant vibrations by utilizing measures in the range of the critical frequencies which trigger the vibrations. During operation of a printing press of this type, undesirable vibrations occur which cause quality impairments in relation to the printed image. The invention reduces quality impairments of this type. The problem is solved by performing targeted loading of the drive of the impression cylinder of the printing press with an exciting signal of the power output to cause vibrations of the impression cylinder, and determining critical frequencies in the resonant frequency spectrum of the impression cylinder using the vibrations which are caused.

14 Claims, 4 Drawing Sheets

(56) References Cited

U.S. PATENT DOCUMENTS

| | | |
|---|---|---|
| 7,478,593 B2 | 1/2009 | Hefftler et al. |
| 7,559,276 B2 | 7/2009 | Mutschler et al. |
| 2007/0034101 A1* | 2/2007 | Hefftler et al. ............ 101/248 |
| 2007/0119319 A1 | 5/2007 | Weber et al. |
| 2007/0120514 A1 | 5/2007 | Buck et al. |

FOREIGN PATENT DOCUMENTS

| | | |
|---|---|---|
| EP | 0 882 588 A1 | 12/1998 |
| EP | 1 355 211 A2 | 10/2003 |
| EP | 1 674 258 A1 | 6/2006 |
| WO | WO 2005/067364 A2 | 7/2005 |

* cited by examiner

PRINTING MACHINE AND METHOD OF OPERATING THE MACHINE TO AVOID UNDESIRED VIBRATIONS

CROSS-REFERENCE TO RELATED APPLICATIONS

This is a national stage of PCT/EP08/059,799 filed Jul. 25, 2008 and published in German, which has a priority of German no. 10 2007 035 476.4 filed Jul. 26, 2007, hereby incorporated by reference.

BACKGROUND OF THE INVENTION

1. Field of Invention

The invention concerns a method for operation of a printing machine, a printing machine as well as a dataset for use on a printing machine.

2. Description of the Prior Art

It is known that a wide variety of vibrations occur during operation of printing machines. These vibrations also include vibrations in the movement of the printing cylinder in its peripheral direction.

Vibrations of this type form the background of documents EP 1 355 211 A2, EP 0 882 588 B1 and DE 197 40 153 C2.

The vibration behavior of a printing cylinder in operation is measured in these documents. In view of the knowledge obtained from the measurements concerning the course of the vibration amplitude relative to the speed of the printing cylinder, two vibrations are generated to compensate for the first-mentioned vibrations. In this way, the printing quality is to be increased by active measures (acting upon them with second "counter-vibrations").

However, resonance frequencies that already occurred in operation are measured in the mentioned documents. Generally, the corresponding vibrations will therefore already have caused errors or deteriorations in quality with reference to the printed image.

SUMMARY OF THE INVENTION

The task of the present invention therefore consists of reducing such quality deteriorations.

The task is solved by including in the claimed method the operating features of the invention described herein.

It is therefore additionally prescribed:
to conduct deliberate exposure of the drive of at least one printing cylinder of the printing machine to an exciting signal of the power output stage, in order to produce vibrations of the printing cylinder,
and to carry out determination of the critical frequencies in the natural frequency spectrum of the at least one printing cylinder by means of the produced vibrations.

An exciting signal can therefore be any signal that fulfills the function of producing vibrations of the printing cylinder—generally this means vibrations in the peripheral direction of the printing cylinder. This task is generally solved by signals that are switched onto the current, with which the drive is supplied. This advantageously involves deliberate changes or jumps in the current forming the torque of the power output stage. Switching the signals can occur before or during operation. It is critical that the signal be released in targeted fashion. In both cases (signal action before or during operation), the signal will permit more rapid determination of critical frequencies and thus contribute to reducing quality deteriorations. Naturally the signal deliberately generated during printing operation can also lead to quality deteriorations on the printed matter. However, the exciting signal can be provided, for example, with a much smaller amplitude than the exciting vibrations have, caused by normal operation.

Frequencies or frequency ranges that trigger undesired vibrations are mostly considered as critical frequencies. According to the present application, however, frequencies are also understood to mean those in which an unfavorable ratio occurs between the amplitude of the exciting and the resulting vibrations, so that printing quality is adversely affected.

Active measures that consist of exposing the vibrating system drive printing cylinder to counter-vibrations are proposed as measures against resonance vibrations or undesired vibrations in the prior art, as already mentioned.

The methods according to the mentioned documents EP 1 355 211 A2, EP 0 882 588 B1 and DE 197 40 153 C2 are demanding, since they require exposure of the printing machine to different vibrations and make them necessary even during the entire operation, in order to achieve success. An advantageous modification of the present invention therefore proposes to avoid undesired vibrations mostly in the area of the printing cylinder by taking passive measures. These passive measures include avoidance of critical frequencies that cause undesired vibrations. Critical frequencies can come about in a variety of ways in exciting vibrations. In the first place, however, critical frequencies in the region of the current furnished by the power output stage of the drive play a role. Harmonics, etc. must be considered here. In modern electronic power output stages, which are often referred to as frequency changers, extremely complex spectra of harmonics occur, since the production of frequencies required by electrical machines in the load current is accomplished electronically, i.e., by very many "chopped" individual pulses very limited in duration. During avoidance of critical frequencies, this circumstance should also be taken into account.

Avoidance itself can occur, for example, by filtering the exciting signals before and/or after the power electronic end stage. The use of a notched filter is advantageous.

It is advantageous
to conduct deliberate exposure of the drive of at least one printing cylinder of the printing machine to an exciting signal of the power output stage, in order to produce vibrations of the printing signal, and
to carryout the determination of critical frequencies in the natural frequency spectrum of at least one printing signal by means of the produced vibrations
at least after changes in the mechanical properties of the corresponding vibrating system. The system exposed to rotational or torsional vibrations in the present context consists at least of the rotor of the driving electrical machine and the printing cylinder. Generally transmission components, like clutches and gears, must also be considered. The vibration behavior of the printing signal is critical for printing quality. Numerous format changes are made, especially in package printing. Here the periphery of the printing cylinder (=printing length) is often changed from order to order, in addition to the printing pattern. This often occurs by replacing the entire printing roll (monolithic printing cylinder, which is generally suspended in the printing machine with pins—often also called axle stub).

An alternative to this replacement of the entire printing roll for the adjustment of the printing length is the use of adapter sleeves of different periphery. These adapter sleeves are pushed onto printing machine mandrels, which have a free or releasable end, and locked on the mandrels. The outer periphery of the adapter sleeve then forms the outer periphery of the printing signal formed by the mandrel and adapter sleeve and carries the printing form. Intaglio and flexographic printing are the leading printing methods in package printing. The aforementioned facts, especially concerning rolls and adapter sleeves, are apparent, for example, in WO 2005/067364 A2.

It is advantageous, especially after changing adapter sleeves or rollers, to carryout process steps according to the invention. A change in mechanical properties that can be considered an execution of the process steps according to the invention, however, can also occur during a change in the setting of the cylinders participating in the printing process.

Tightening of a printed web, which is measurable, can also precede performance of these process steps.

The method according to the invention can be modified, so that before the exciting vibrations cross critical frequency ranges and/or resonance frequencies, they are avoided or compensated by counter-vibrations.

It should be noted in general that the system rotor, clutch/gear mechanism, as well as the printing cylinder, is similar in is vibration behavior to a two-mass system connected with a spring.

When the drive is exposed to an exciting signal, the procedure can be such, that the exciting signal causes at least one excursion of the printing signal from its instantaneous movement situation (for example, stopping or printing operation).

Another improvement of the results can be achieved by having the exciting signal encompass a broader frequency range. A variation of amplitudes of the corresponding vibrations is also advantageous.

A control device of a printing machine according to the invention should be set up, so that it can execute the method according to the invention. For this purpose, it could be acted upon by corresponding program commands. It must have a connection to the required measurement and excitation devices and to the actual drives, with which it can control them or communicate with them.

An excitation device can include power electronic components that introduce the corresponding exciting signals into the current that drives the motor. The corresponding power electronic components must then be appropriately controllable.

Hardware integration of this excitation device appears to be possible in the normal power output stage. The control device of the power output stage and/or the control device of the printing machine can also be set up appropriately. For this purpose, exposure to appropriate control commands or software components can be used.

The control device of the printing machine should be set up so that it controls or reads out the measurement device after the exciting signal has been produced. A rotational sensor or similar measurement device for angle of rotation and speed, which is connected to a printing cylinder, is advantageous as a measurement device. According to the present invention, a dataset can be an arbitrary combination of control commands or software. With such a dataset, the control device can be acted upon or set up, so that the method according to the invention can be conducted automatically.

The dataset can be present with the control device, but also on any embodied data carrier, like a DVD, CD, diskette. Transport of the dataset via networks and the Internet is also possible. Email can be used for this purpose, for example.

In the language of present printing, the terms "connection and interface" are defined functionally. They include all possibilities of permitting communication between two machine components or functional components. Classic data lines belong to these possibilities, just like "radio links." At locations where several functional components are combined with each other in a hardware component, several interfaces or lines are nevertheless at issue, in order to account for the corresponding setup of the interface or line for communication with different functional components.

Preferred practical examples of the invention are explained below with reference to figures.

DETAILED DESCRIPTION OF THE PREFERRED EMBODIMENTS

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

Figure 1:
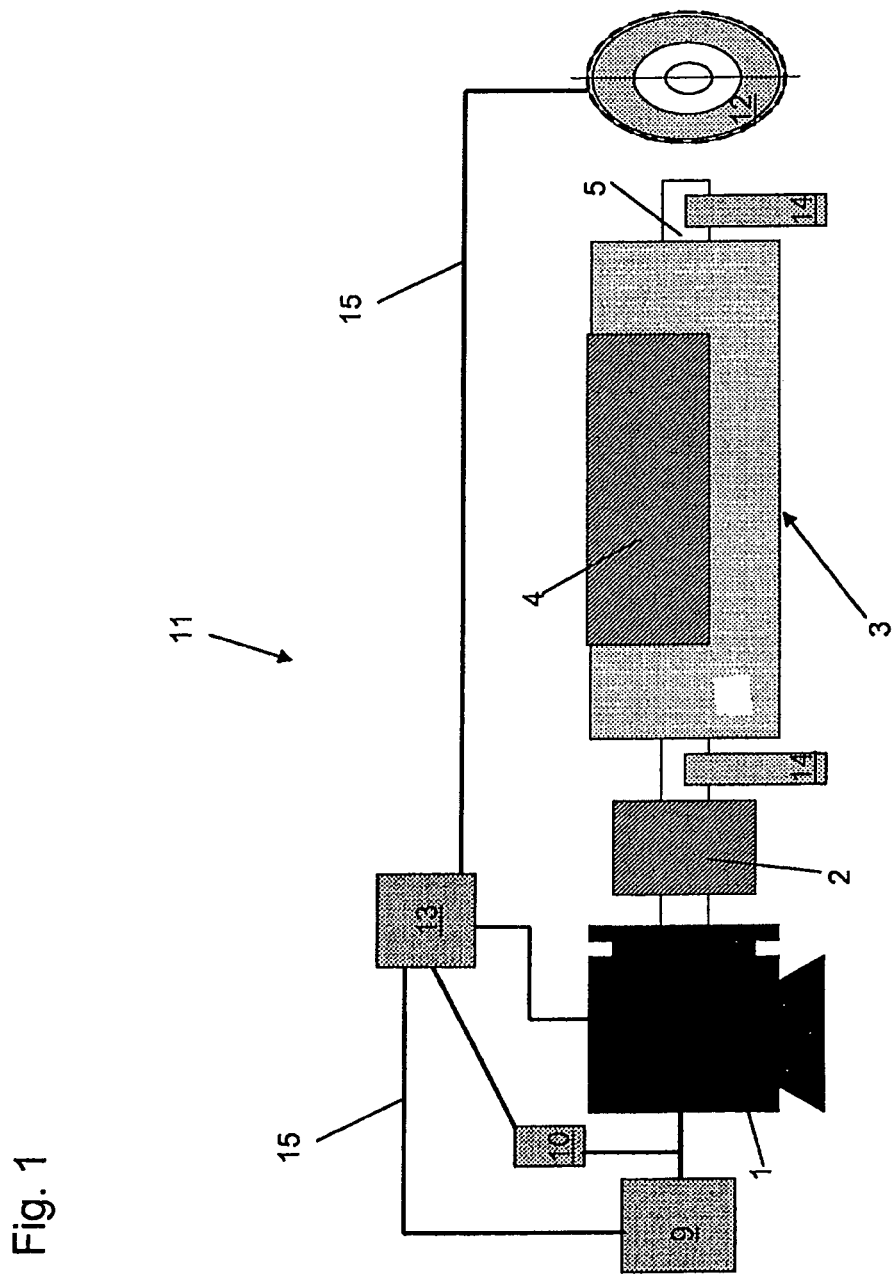
FIG. 1 a functional sketch of a first printer with a directly driven printing cylinder.

FIG. 1 shows a printer 11 with a drive 1, which drives the printing cylinder 3 via a bellows clutch 2. A printing block 4, as is common in flexographic printing, is situated on the outer periphery of the printing cylinder 3 as a glued-on printing form. The mandrel 5 carrying the printing cylinder 3 rests, in turn, on the bearing locations 14.

The drive 1 receives the power required by it from a frequency changer 9, which functions here as a power output stage. The filter 10 indicates that the signal of the power output stage 9 is filtered, in order to avoid critical frequencies during the supply of the drive 1. The filter 10 can, in fact, also be mounted on the power side of the frequency changer 9, as indicated in FIG. 1. Generally, the filtering of critical frequencies, however, is already carried out before the power part.

The rotation sensor 12 serves here as the measurement device. Its connection 15 to the support mandrel 5 of the printing cylinder 3 is only indicated. In this type of arrangement (rotation sensor 12) on the side of the printing cylinder 3 facing away from the drive 1, the vibrations of the printing cylinder 3 can be measured particularly well. However, it is also possible to measure on the other side of the printing cylinder 3.

The control device 13, which can communicate via connections 15 to most of the other devices of the printing machine and control them, is of special significance. In the present example, the excitation device for the deliberate exposure of the drive of the at least one printing cylinder of the printing machine to an exciting signal of the power output stage 9, with which signal the vibrations of the printing cylinder 3 can be produced, is integrated in the frequency changer 9, so that the line between the frequency changer 9 and the control device 13 also serves as a line between the control device 13 and the excitation device. It is critical in this case that the frequency changer 9 and the control device 13 are set up by programs to execute these signals according to the invention.

Figure 2:
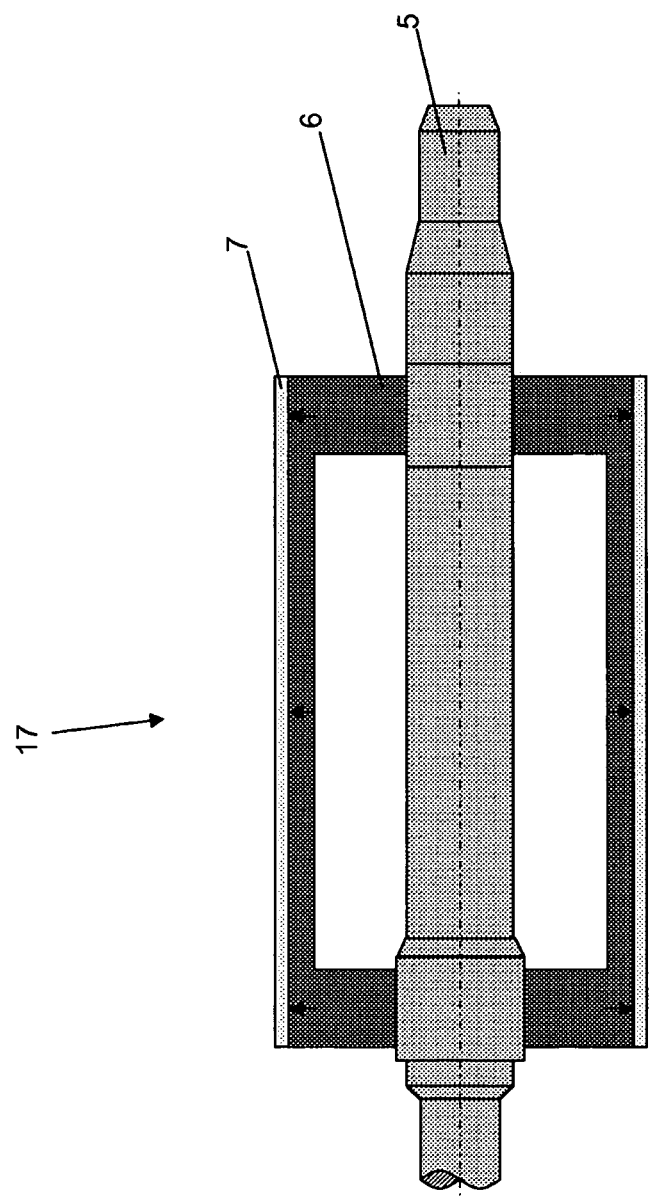
FIG. 2 a section through a printing cylinder, which consists of a largely hollow adapter sleeve and a support mandrel.
Figure 3:
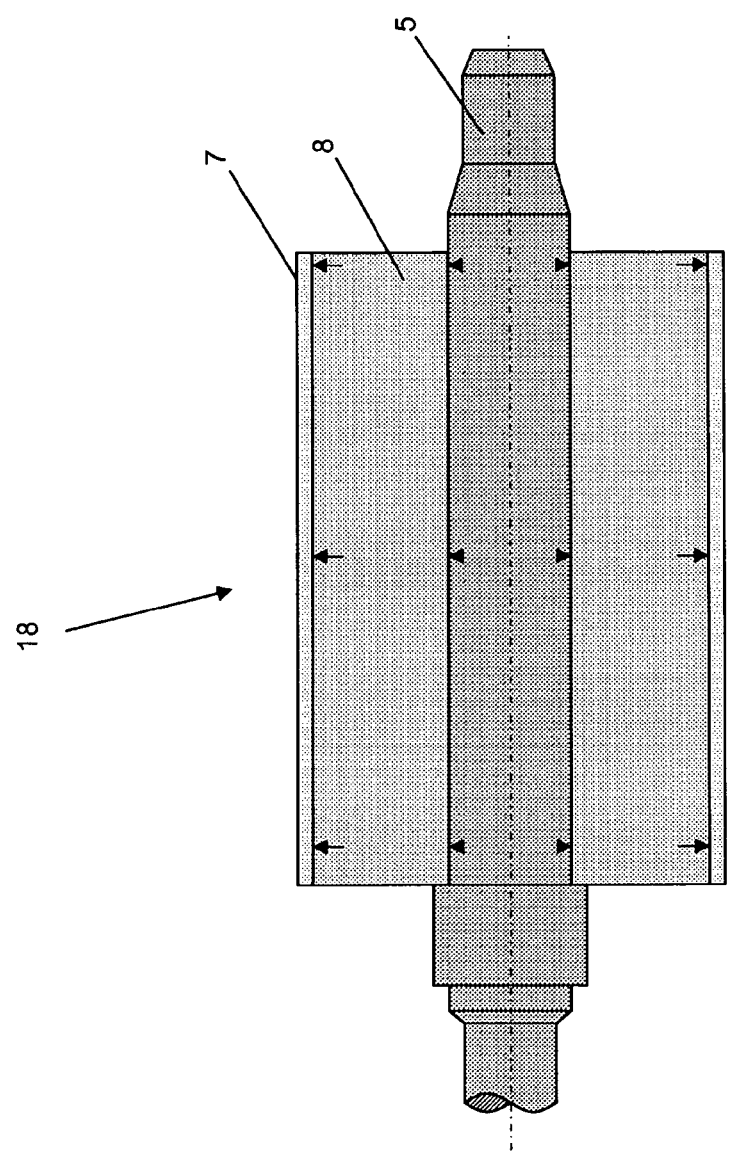
FIG. 3 a section through a printing cylinder, consisting of an adapter sleeve and a support mandrel essentially filled with polyurethane film.

FIG. 2 shows a section through a second printing cylinder 17, which consists essentially of an essentially hollow adapter sleeve 6 and a support mandrel 5. The functional unit between the adapter sleeve 6 and support mandrel 5 comes about by pulling the adapter sleeve 6 over mandrel 5. By the replacement of such an adapter sleeve 6 with an adapter sleeve 6 of different periphery, the printing length can be changed particularly quickly. In this depicted practical example, a printing sleeve 7, which carries the actual printing form, is pushed over the adapter sleeve 6.

The third printing cylinder 18 has only one difference relative to the second printing cylinder 17: the adapter sleeve 8 of the third printing cylinder 18, in contrast to the adapter sleeve 6, is filled with a foam material, generally polyurethane.

As already mentioned, it must be considered in printing cylinders, which, like printing cylinders 17 and 18, consist essentially of adapter sleeves 6, 8 and support mandrel 5, that the moment of inertia of the printing cylinder is sharply changed when the adapter sleeves 6, 8 are changed.

It is therefore advantageous to check the critical frequencies of the "rearranged" printing cylinder at least once after such a change.

Figure 4:
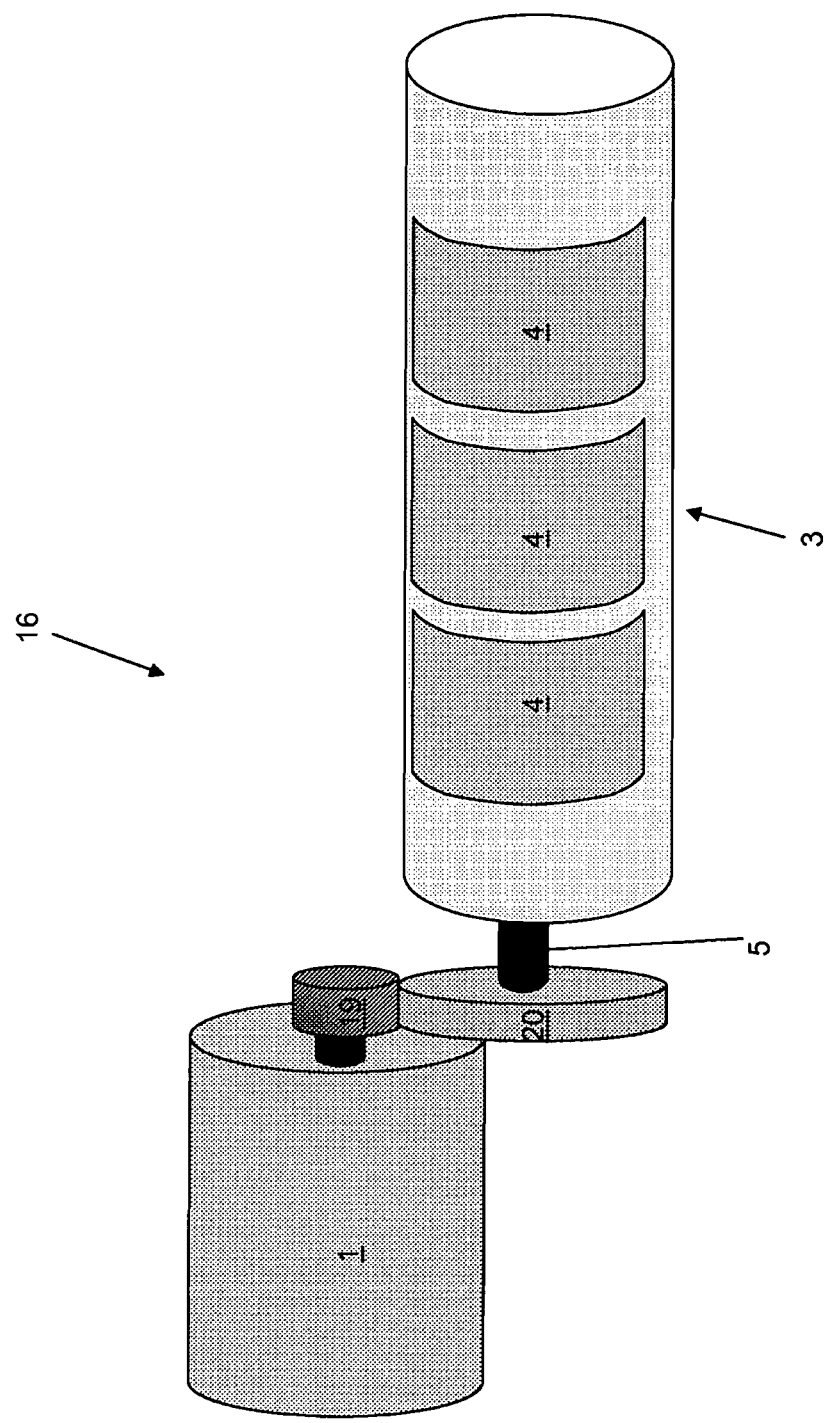
FIG. 4 a functional sketch of a second printer with a printing cylinder that receives its torque via a gear connection.

FIG. 4 shows a sketch of a printer—here the second printer 16—which has a drive 1 and a printing cylinder 3, like printer 11. Unlike the first printer 11, the torque between motor 1 and printing cylinder 3, however, is transferred in gearless fashion via a bellows clutch 2. In the second printer 16, the gears 19 and 20 serve as the transmission. They transfer the drive torque.

It is important that neither the bellows clutch 2 nor the gear mechanism can be infinitely rigid, so that vibrations invariably occur in the entire system (drive train). Tests have shown that the drive train of the directly driven printer 11 is more prone to vibrations than the geared printer 16. For this reason, the use of the measures according to the invention is particularly advantageous in directly driven printers 3.

The invention being thus described, it will be apparent that the same may be varied in many ways. Such variations are not to be regarded as a departure from the spirit and scope of the invention, and all such modifications as would be recognized by one skilled in the art are intended to be included within the scope of the following claims.

| List of reference numbers | |
|---|---|
| 1 | Drive unit/drive motor |
| 2 | Bellows clutch |
| 3 | Printing cylinder |
| 4 | Load |
| 5 | Support mandrel |
| 6 | Largely hollow adapter sleeve for printing sleeve or sleeve |
| 7 | Printing sleeve or sleeve |
| 8 | Foam adapter |
| 9 | Frequency sensor |
| 10 | Frequency or blocking filter |
| 11 | First printer |
| 12 | Rotation sensor/measurement device |
| 13 | Control device |
| 14 | Bearing site |
| 15 | Connections |
| 16 | Second printer |
| 17 | Second printing cylinder |
| 18 | Third printing cylinder |
| 19 | First gear |
| 20 | Second gear |

What is claimed is:

1. A method of operating a printing machine, said method comprising the following steps:

determining a vibration behavior of at least one printing cylinder of the printing machine;

avoiding or suppressing undesired first vibrations by utilizing measures in a region of critical frequencies that trigger the first vibrations;

exposing a drive of the at least one printing cylinder of the printing machine to an exciting signal of a power output stage, in order to produce vibrations of the printing cylinder; and determining the critical, frequencies in a natural frequency spectrum of the at least one printing cylinder in the printing machine via the produced vibrations, in which at least resonance frequencies of a system rotor-transfer element associated with the printing cylinder are recorded as the critical frequencies, avoiding the determined critical frequencies by using a filter, and filtering, with the filter, signals that control power electronic components of the power output stage.

2. The method according to claim 1, further comprising a step of applying active measures.

3. The method according to claim 2, wherein the active measures include applying second vibrations to compensate for the first vibrations.

4. The method according to claim 1,
wherein the step of avoiding the determined critical frequencies occurs during supply of the drive of the at least one printing cylinder through the power output stage.

5. The method according to claim 1,
wherein the steps of determining the critical frequencies and exposing the drive of the at least one printing cylinder of the printing machine to the exciting signal of the power output stage, in order to produce the vibrations of the printing cylinder, is conducted at least after each change in mechanical properties of the at least one printing cylinder.

6. The method according to claim 1,
wherein the steps of determining the critical frequencies and exposing the drive of at least one printing cylinder of the printing machine to the exciting signal of the power output stage, in order to produce the vibrations of the printing cylinder, is carried out at least once after a mounting of the at least one printing cylinder on a counter-printing cylinder.

7. The method according to claim 1,
wherein the step of exposing the drive to the exciting signal of the power output stage, in order to produce the vibrations of the at least one printing cylinder, occurs at least once, while the printing cylinder is not rotating.

8. The method according to claim 1,
wherein the step of exposing the drive to the exciting signal of the power output stage, in order to produce the vibrations of the printing cylinder, occurs at least once, while the printing cylinder is rotating.

9. The method according to claim 8, wherein the rotating of the printing cylinder occurs during the printing operation.

10. The method according to claim 1,
wherein the exciting signal produces at least one excursion of the printing cylinder from an instantaneous state of motion associated therewith.

11. The method according to claim 10,
wherein the excursion includes at least one of exceeding the frequencies of a certain frequency range and having a certain amplitude range.

12. The method according to claim 1, wherein the first vibrations are a resonance vibrations.

13. A printing machine comprising:

a control device, which has a connection with a measurement device to determine vibration behavior of at least one printing cylinder of the printing machine, the control device being configured to cause the measurement device before and/or during printing operation to determine the vibration behavior of at least one printing cylinder of the printing machine, the control device having a connection to a device to avoid or suppress undesired vibrations of the printing cylinder by utilizing measures in a range of critical frequencies that trigger the vibrations, the control device being configure to drive the device to avoid or suppress the undesired vibrations of the printing cylinder during printing operation;

an excitation device, for deliberate exposure of a system rotor-torque transfer element associated with the printing cylinder of the printing machine to an exciting signal of a power output stage, with which signal vibrations of the system rotor-torque transfer element are produced; and a filter for avoiding the determined critical frequencies, the control device having a connection to the excitation device and being configured so that the control device drives the excitation device before and/or during printing operation, with the measurement device being configured so that the vibrations of the system rotor-torque transfer element are measurable, and with signals that control power electronic components of the power output stage being already filtered with the filter.

14. A control device for a printing machine with interfaces for communication and control of elements of the printing machine, said control, device including:

a measurement device to determine a vibration behavior of at least one printing cylinder of the printing machine;

a device to avoid or suppress undesired vibrations of the printing cylinder by utilizing measures in a range of critical frequencies that trigger the vibrations; and an interface, on the control, device, to an excitation device for deliberate exposure of a drive of the at least one printing cylinder of the printing machine to an exciting signal of a power output stage, with which signal vibrations of the printing cylinder are produced, the control device being configured for automated performance of at least the method of claim 1.

* * * * *